US011285925B2

(12) United States Patent
Kim

(10) Patent No.: US 11,285,925 B2
(45) Date of Patent: Mar. 29, 2022

(54) FOLDABLE BRAKE PEDAL APPARATUS FOR AUTONOMOUS DRIVING VEHICLE

(71) Applicants: Hyundai Motor Company, Seoul (KR); Kia Motors Corporation, Seoul (KR)

(72) Inventor: Eun Sik Kim, Gyeonggi do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 27 days.

(21) Appl. No.: 16/881,610

(22) Filed: May 22, 2020

(65) Prior Publication Data

US 2021/0276516 A1 Sep. 9, 2021

(30) Foreign Application Priority Data

Mar. 5, 2020 (KR) .................... 10-2020-0027483

(51) Int. Cl.
*B60T 7/04* (2006.01)
*B60T 7/06* (2006.01)

(52) U.S. Cl.
CPC .............. *B60T 7/042* (2013.01); *B60T 7/06* (2013.01); *B60T 2220/04* (2013.01)

(58) Field of Classification Search
CPC ........ B60T 7/042; B60T 7/06; B60T 2220/04; B60T 2270/82; B60R 21/09; G05G 1/40; G05G 1/405
See application file for complete search history.

(56) References Cited

U.S. PATENT DOCUMENTS

| 3,282,125 A * | 11/1966 | Dully ..................... G05G 1/405 74/560 |
| 4,386,537 A * | 6/1983 | Lewis ....................... B60T 7/06 74/512 |
| 6,360,629 B2 * | 3/2002 | Schambre ............. G05G 1/405 74/512 |
| 6,408,712 B1 * | 6/2002 | Bolisetty ................. G05G 1/30 74/514 |
| 6,609,438 B1 * | 8/2003 | Bigham .................. G05G 1/30 74/512 |
| 6,782,775 B2 * | 8/2004 | Hayashihara .......... G05G 1/405 74/512 |

FOREIGN PATENT DOCUMENTS

KR 10-2017-0137427 A 12/2017

* cited by examiner

*Primary Examiner* — Thomas C Diaz
(74) *Attorney, Agent, or Firm* — Mintz Levin Cohn Ferris Glovsky and Popeo, P.C.; Peter F. Corless

(57) ABSTRACT

A foldable brake pedal apparatus for an autonomous driving vehicle is provided. In a manual driving mode in which a driver directly operates a vehicle, a lower end of a brake pedal is exposed to an interior of the vehicle to allow engagement of the brake pedal by a driver and, in an autonomous driving mode in which the driver does not directly drive the vehicle, the lower end of the brake pedal is pivoted and moved forward due to an operation of an actuator to switch to a concealed state in which an operation of the brake pedal is blocked.

11 Claims, 12 Drawing Sheets

FOLDABLE BRAKE PEDAL APPARATUS FOR AUTONOMOUS DRIVING VEHICLE

CROSS REFERENCE TO RELATED APPLICATION

The present application claims priority of Korean Patent Application No. 10-2020-0027483 filed on Mar. 5, 2020, the entire contents of which is incorporated herein for all purposes by this reference.

BACKGROUND

Field of the Disclosure

The present disclosure relates to a foldable brake pedal apparatus for an autonomous driving vehicle, and more particularly, to a foldable brake pedal apparatus, in which a brake pedal is exposed to an interior of the vehicle to allow operation of the brake pedal in a manual driving mode, and the exposure of the brake pedal to the interior thereof is blocked to prevent operation of the brake pedal in an autonomous driving mode.

Description of the Related Art

Autonomous vehicles are smart vehicles incorporating an autonomous driving technology which self-drives the vehicle toward a destination without driver intervention that is, without a driver having to directly operate a steering wheel, an accelerator pedal, and a brake. This technology has been rapidly developed in recent years. When an autonomous driving situation is universally realized, a manual driving mode in which a driver directly drives and an autonomous driving mode in which a vehicle drives toward a destination without the driver having to directly drive may be selected.

In the autonomous driving mode, since the driver should be able to rest comfortably by extending his or her feet, when a pedal (including an accelerator pedal and a brake pedal) disposed in a lower space of a driver seat remains exposed to an interior of the vehicle (e.g., protrudes into the vehicle), there is a disadvantage of hindering rest of the driver. Further, an autonomous driving mode is a mode in which the driver does not operate the pedal (including the accelerator pedal and the brake pedal) of the vehicle. When the driver operates or engages the pedal during autonomous driving, a vehicle controller determines terminates driver intention to terminate the autonomous driving and switch to a manual mode in which the driver directly operates the vehicle, thereby terminating control for the autonomous driving.

However, since the pedal of the vehicle is installed to be exposed to the lower space of the driver seat, the driver may unconsciously operate the pedal in the autonomous driving mode (e.g., a situation in which the pedal is incorrectly operated). In particular, an accident may occur according to a road condition or a distance between vehicles. Therefore, it is necessary for technological development of a new pedal apparatus in which, in a manual driving mode in which a driver directly operates a vehicle, a pedal is exposed to an interior of the vehicle for the driver to operate the pedal, and, in an autonomous driving mode, exposure of the pedal to the interior of the vehicle is blocked to prevent the driver from inadvertently operating the pedal and for comfortable rest of the driver.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a foldable brake pedal apparatus for an autonomous driving vehicle, in which a brake pedal is exposed to an interior of a vehicle to allow operation of the brake pedal in a mode in which the driver directly operates the vehicle, and, in an autonomous driving mode in which the driver does not directly operate the vehicle, exposure of the brake pedal to the interior of the vehicle may be blocked to prevent the driver from operating the brake pedal thus allowing the driver to rest comfortably in the autonomous driving mode, and achieving safety improvement by blocking an incorrect operation of the brake pedal in the autonomous driving mode.

According to one aspect, a foldable brake pedal apparatus for an autonomous driving vehicle may include a pedal member fixedly installed in a lower space of a driver seat and in which guide slots are formed in left and right side surfaces of the pedal member and extend in a front-rear direction; a pedal shaft installed to pass through the left and right side surfaces of the pedal member through the guide slots and moved along the guide slots; and a brake pedal coupled to the pedal shaft and in which a lower part of the pedal shaft is connected to a brake booster through a pedal push rod. When the pedal shaft is disposed at a front end of the guide slot, a lower end of the brake pedal may be maintained in a pop-up state of being exposed to an interior of a vehicle in which a driver is present, and when the pedal shaft is moved from the front end of the guide slot to a rear end thereof, the brake pedal may be pivoted around a connection point together with the pedal push rod to pivot the lower end of the brake pedal forward to change to a concealed state to not be exposed to the interior.

The foldable brake pedal apparatus may further include an actuator fixedly installed in the pedal member; and a connecting bracket configured to connect the actuator to the pedal shaft and transmit power of the actuator to the pedal shaft to move the pedal shaft along the guide slot when the actuator is operated. Additionally, the foldable brake pedal apparatus may include a return spring installed to connect the pedal member to the brake pedal and configured to accumulate an elastic force as a length of the return spring is stretched when the driver engages the brake pedal and thus the brake pedal may be pivoted forward and pivot and return the brake pedal rearward with the accumulated elastic force when the driver releases the brake pedal.

The foldable brake pedal apparatus may further include a permanent magnet fixedly coupled to one end surface of the pedal shaft; and a non-contact pedal sensor fixedly installed in the pedal member. When the permanent magnet faces the non-contact pedal sensor, only when the pedal shaft is pivoted, the non-contact pedal sensor may be configured to detect a rotation angle of the permanent magnet through a variation in strength of a magnetic field due to a variation in pivoting position of the permanent magnet, thereby generating a signal related to braking.

The guide slot may be formed in an arc shape extending along a pivoting radius based on a connection point of the brake pedal and the pedal push rod in a front-rear direction, the permanent magnet, which is coupled to the pedal shaft when the pedal shaft is disposed at the front end of the guide slot, may be maintained in a state of facing the non-contact pedal sensor, and when the brake pedal is pivoted in the state in which the permanent magnet faces the non-contact pedal sensor, the non-contact pedal sensor may be configured to generate the signal related to braking.

The guide slot may be formed in an arc shape extending along a pivoting radius based on a connection point of the brake pedal and the pedal push rod in a front-rear direction. When the pedal shaft is moved to slide from a position of the front end of the guide slot toward a position of the rear end thereof, the state in which the permanent magnet coupled to the pedal shaft faces the non-contact pedal sensor may be terminated, and when the brake pedal is pivoted upon termination of the state in which the permanent magnet faces the non-contact pedal sensor, the non-contact pedal sensor may not generate the signal related to braking to be capable of preventing an incorrect operation of the brake pedal. The guide slots may be formed in the same shape on the left and right side surfaces of the pedal member, each of the guide slots may be formed in an arc shape extending along a pivoting radius based on a connection point of the brake pedal and the pedal push rod in a front-rear direction, and the front end and the rear end of each of the guide slots may be formed in a closed structure due to the pedal member.

The actuator may include a step motor and a motor shaft, a motor shaft coupling aperture and a pedal shaft coupling aperture may be formed at a first side and a second side of the connecting bracket. The motor shaft may be inserted into the motor shaft coupling aperture and thus the connecting bracket may be integrally coupled to the motor shaft. The pedal shaft may be inserted into the pedal shaft coupling aperture, and the pedal shaft coupling aperture may be formed as an elliptical long aperture to allow movement of the pedal shaft when the connecting bracket is pivoted together with the motor shaft.

The pedal shaft coupling aperture formed in the elliptical long aperture may be formed to pass through left and right side surfaces of the connecting bracket along a length direction of the pedal shaft, a first end of the pedal shaft coupling aperture toward the motor shaft coupling aperture may be formed in a closed structure, and a second end of the pedal shaft coupling aperture in a direction opposite to the first end thereof may be formed in an open structure. The pedal shaft coupling aperture formed in the elliptical long aperture may be formed to pass through left and right side surfaces of the connecting bracket along a length direction of the pedal shaft, and a first end of the pedal shaft coupling aperture toward the motor shaft coupling aperture and a second end thereof in a direction opposite to the first end thereof may be formed in a closed structure.

A pedal insertion aperture formed in a length direction of the pedal shaft coupling aperture may be formed at an intermediate position of the connecting bracket in a portion in which the pedal shaft coupling aperture is formed in the connecting bracket in a left-right direction, the pedal insertion aperture may be divided into a first leg portion and a second leg portion at which the pedal shaft coupling aperture is formed at each of left and right sides of the pedal insertion aperture based on the pedal insertion aperture. Additionally, an upper end of the brake pedal coupled to the pedal shaft may be inserted into the pedal insertion aperture, and both ends of the pedal shaft protruding to both sides of the brake pedal may be inserted into and coupled the pedal shaft coupling apertures of the first leg portion and the second leg portion. The motor shaft may be disposed above the pedal shaft inserted into the guide slot and thus, when the connecting bracket is pivoted together with the motor shaft, the motor shaft may be capable of preventing a release phenomenon of the pedal shaft from the pedal shaft coupling aperture.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
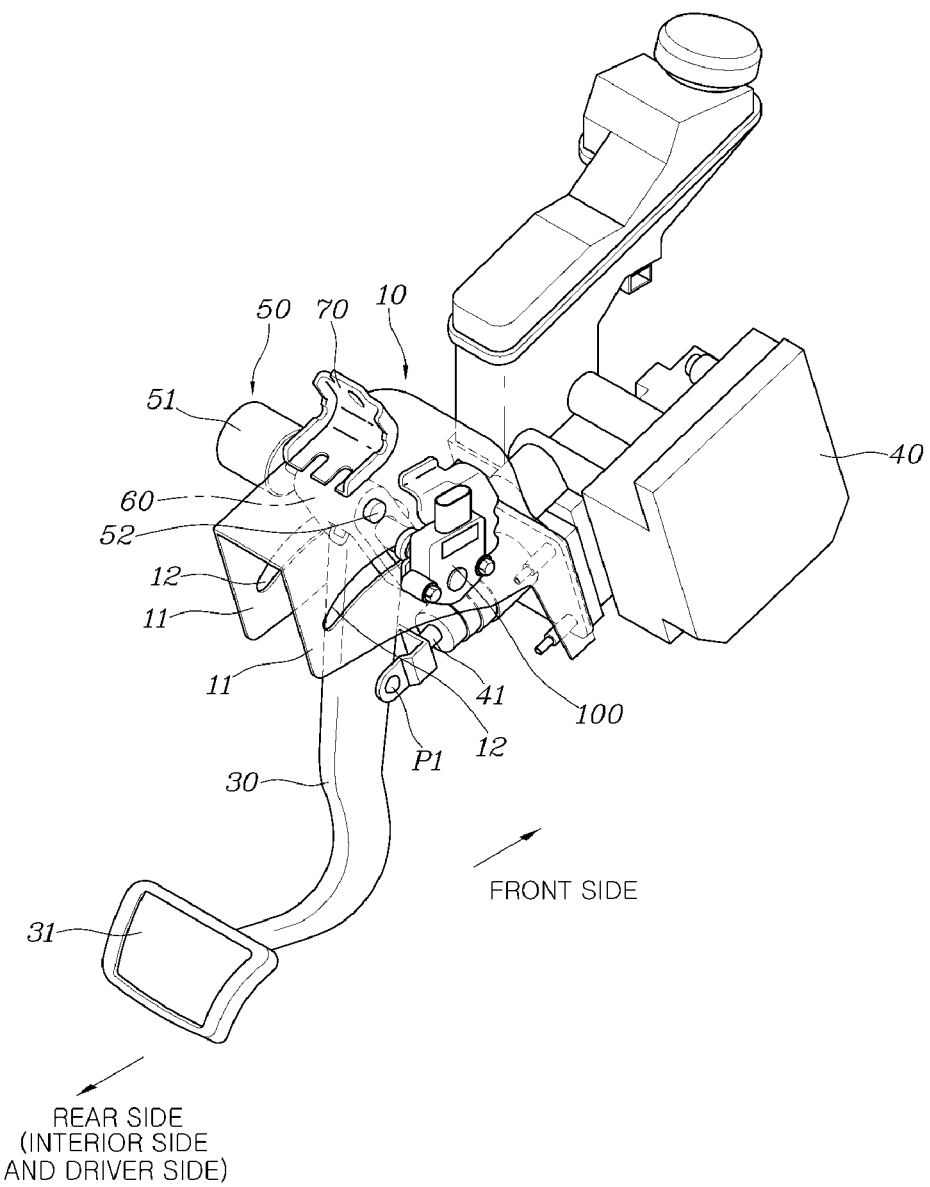
FIGS. 1 to 3 are a perspective view, a front view, and a side view of a foldable brake pedal apparatus for an autonomous driving vehicle according to an exemplary embodiment of the present disclosure.
Figure 2:
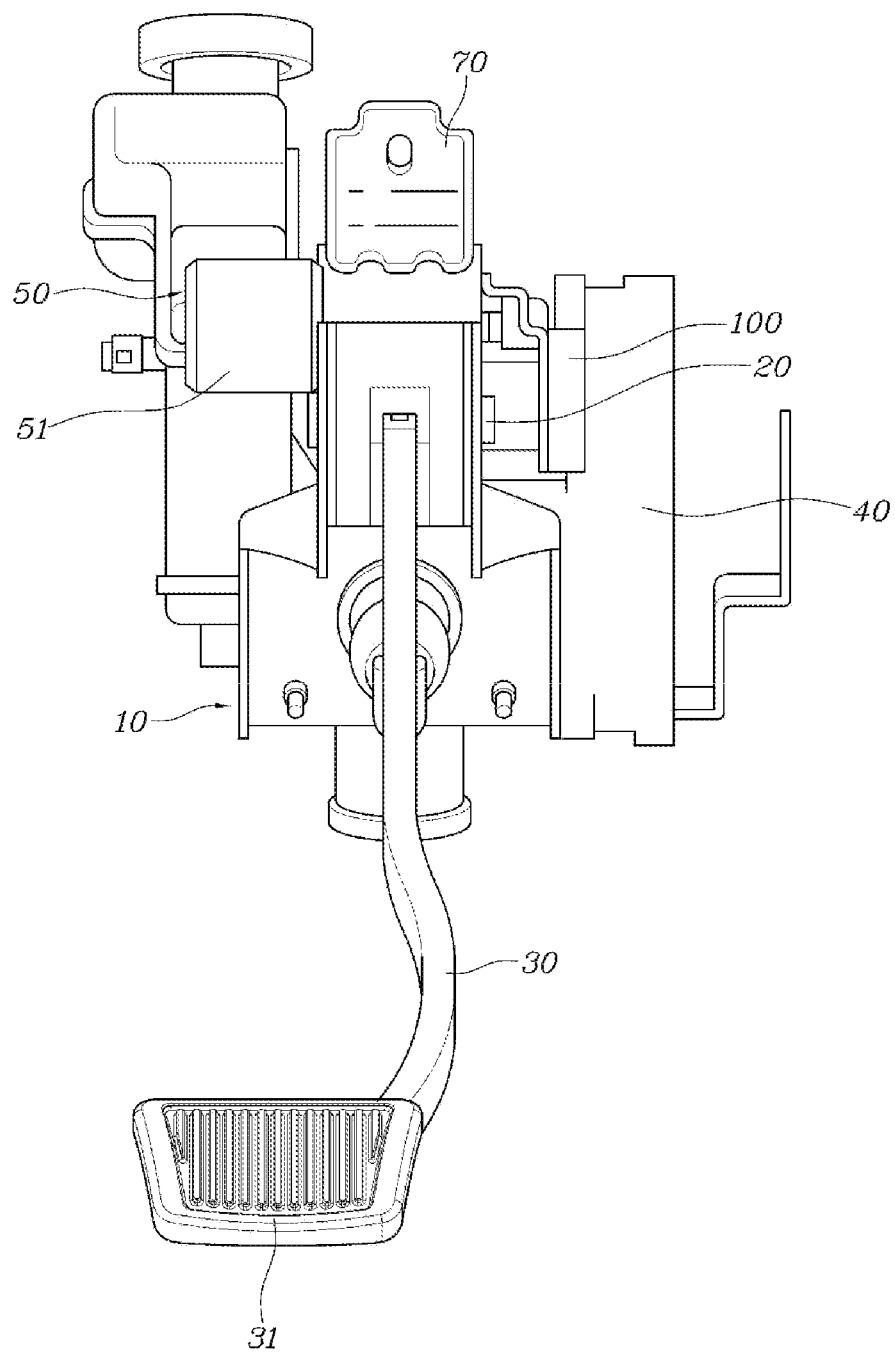
Figure 3:
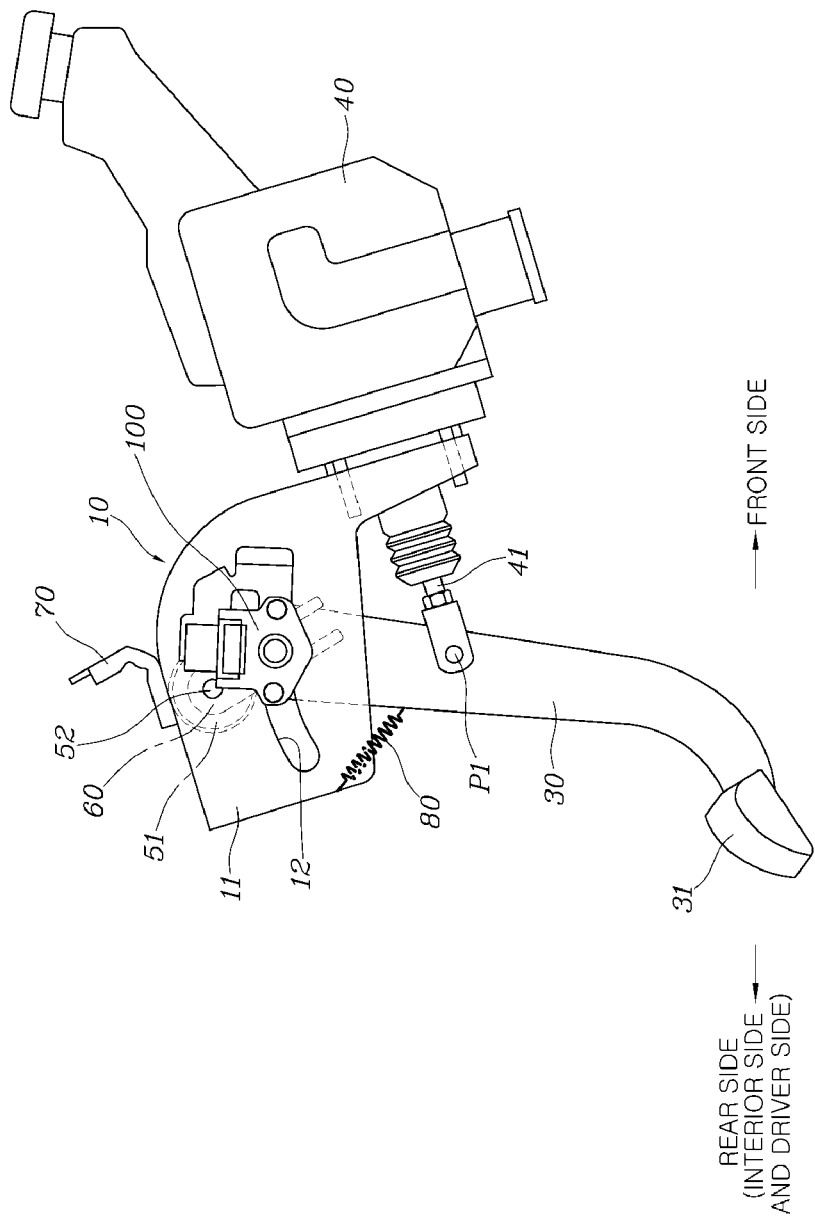
Figure 4:
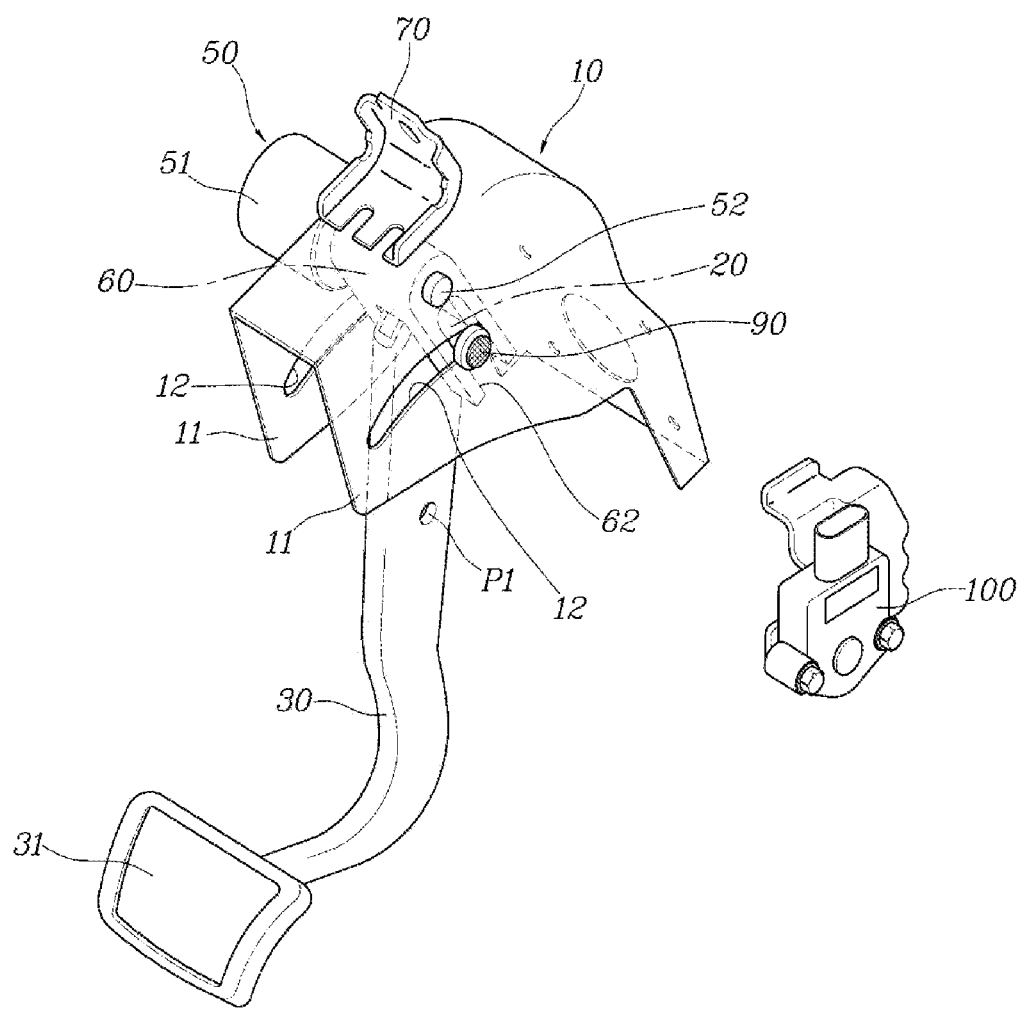
FIG. 4 is a perspective view illustrating a state in which a non-contact pedal sensor is separated from a pedal member according to an exemplar)/embodiment of the present disclosure.
Figure 5:
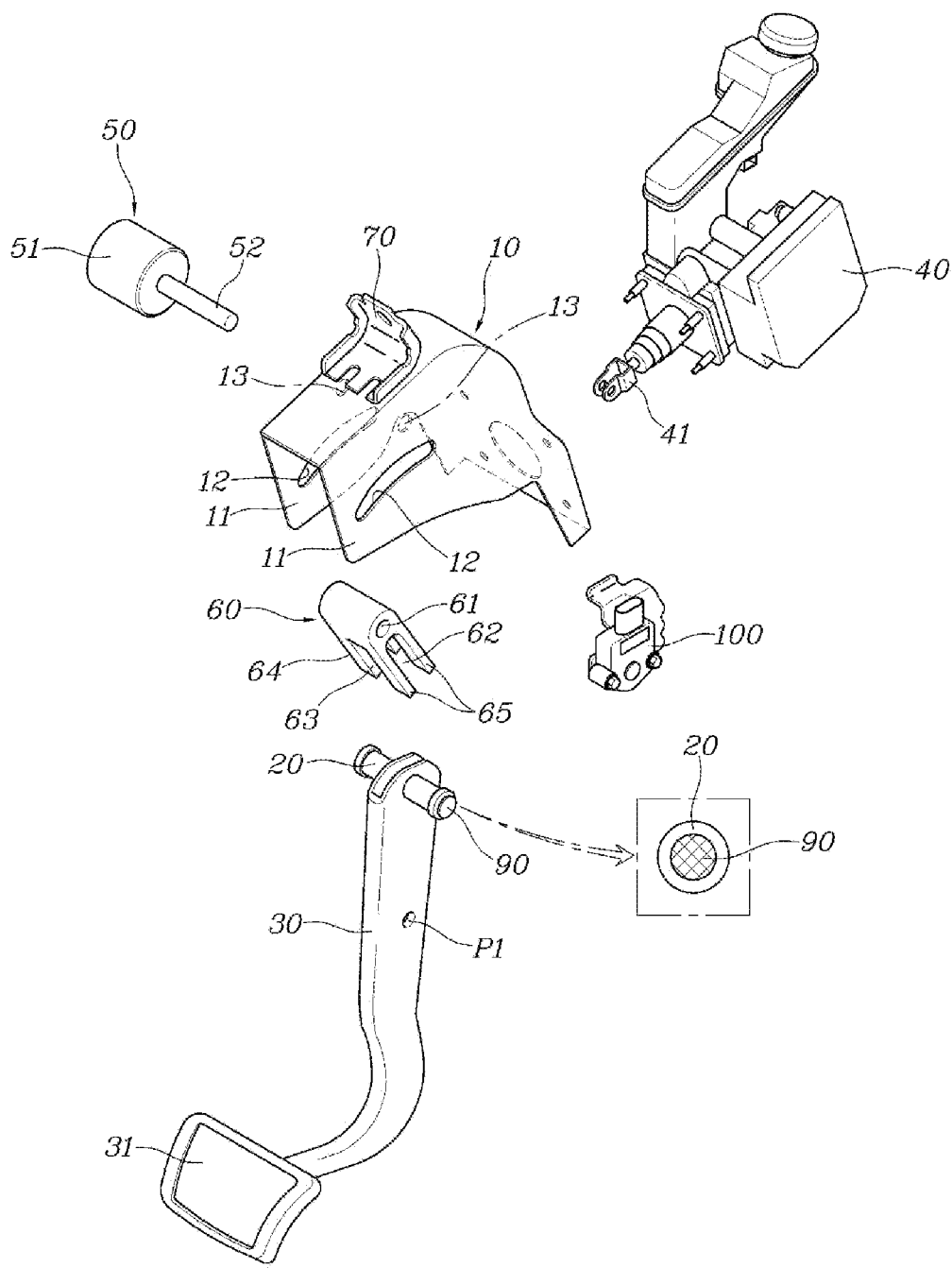
FIG. 5 is an exploded perspective view illustrating the foldable brake pedal apparatus for an autonomous driving vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a foldable brake pedal apparatus for an autonomous driving vehicle according to exemplary embodiments of the present disclosure will be described with reference to the accompanying drawings.

As shown in FIGS. 1 to 12, a foldable brake pedal apparatus for an autonomous driving vehicle according to the present disclosure may include a pedal member 10 fixedly installed in a lower space of a driver seat and in which guide slots 12 may be formed on left and right side surfaces 11 in a front-rear direction; a pedal shaft 20 installed to pass through the left and right side surfaces 11 of the pedal member 10 through the guide slots 12 and move along the guide slots 12; a brake pedal 30 having an upper end coupled to the pedal shaft 20 and in which a lower portion of the pedal shaft 20 is connected to a brake booster 40 through a pedal push rod 41; an actuator 50 fixedly installed in the pedal member 10; and a connecting bracket 60 configured to connect the actuator 50 to the pedal shaft 20 and transmit power of the actuator 50 to the pedal shaft 20 to move the pedal shaft 20 along the guide slots 12 when the actuator 50 is operated.

The pedal member 10 may have an outer shape formed substantially in a square box shape and an interior of thereof may be empty and may be open to a lower side and a rear side. A front surface of the pedal member 10 may be fixed to a dash panel of a vehicle body, and a cowl bracket 70 may be coupled to an upper surface of the pedal member 10 and coupled to a cowl panel. The guide slots 12 may be formed to pass through a left side surface 11 and a right side surface 11 of the pedal member 10 in the same shape. In particular, each of the guide slots 12 may be formed in an arc shape extending along a pivoting radius based on a connection point P1 of the brake pedal 30 and the pedal push rod 41 in the front-rear direction. Since both a front end and a rear end of the guide slot 12 may be formed of a closed structure by the pedal member 10, a shape of the guide slot 12 may be maintained without deformation, and further, strength of the pedal member 10 may be maintained.

The pedal shaft 20 may pass through an upper end portion of the brake pedal 30 in a left-right direction and may be integrally coupled to the brake pedal 30 by welding, but the present disclosure is not limited thereto. An upper portion of the brake pedal 30 coupled to the pedal shaft 20 may be inserted into the pedal member 10. Both ends of the pedal shaft 20 protruding to both sides of the brake pedal 30 may be installed in the form of being inserted into the guide slots 12 formed on the left and right side surfaces 11 of the pedal member 10. Thus, when the driver engages a pad 31 provided at a lower end of the brake pedal 30, the pedal shaft 20 may be pivoted in the guide slot 12, the brake pedal 30 may be pivoted forward with respect to the pedal member 10 due to the pivoting of the pedal shaft 20, and, when the brake pedal 30 is pivoted forward, the brake booster 40 may be operated due to a forward movement of the pedal push rod 41 to generate a hydraulic pressure required for braking.

Further, the exemplary embodiment according to the present disclosure may include a return spring 80 installed to connect the pedal member 10 to the brake pedal 30. When the brake pedal 30 is pivoted forward as the driver engages the brake pedal 30, the return spring 80 accumulates an elastic force as a length of the return spring 80 is stretched, and, when the driver releases the brake pedal 30, the return spring 80 pivots the brake pedal 30 to return to an initial position of the brake pedal 30 with the accumulated elastic force. In particular, the return spring 80 may be a compressed coil spring, but present disclosure is not limited thereto.

The actuator 50 may include a step motor 51 and a motor shaft 52 rotated when the step motor 51 operates. The step motor 51 may be fixed to one side of the pedal member 10 from the outside. Accordingly, the step motor 51 may be fixedly coupled via a separate bracket. The motor shaft 52 may be installed to pass through the side surfaces 11 of the pedal member 10. Accordingly, apertures 13 may be formed on the side surfaces 11 of the pedal member 10 to allow the motor shaft 52 to pass through the side surfaces 11.

The connecting bracket 60 may be configured such that a motor shaft coupling aperture 61 and a pedal shaft coupling aperture 62 are formed at a first side position and a second side position of the connecting bracket 60. The motor shaft 52 may be inserted into the motor shaft coupling aperture 61, and thus the connecting bracket 60 may be integrally coupled to the motor shaft 52. Thus, when the motor shaft 52 is rotated due to an operation of the step motor 51, the connecting bracket 60 may be pivoted together with the motor shaft 52. The pedal shaft 20 may be inserted into the pedal shaft coupling aperture 62. The pedal shaft coupling aperture 62 may be formed as an elliptical long aperture to allow movement of the pedal shaft 20 when the connecting bracket 60 is pivoted together with the motor shaft 52.

Figure 10:
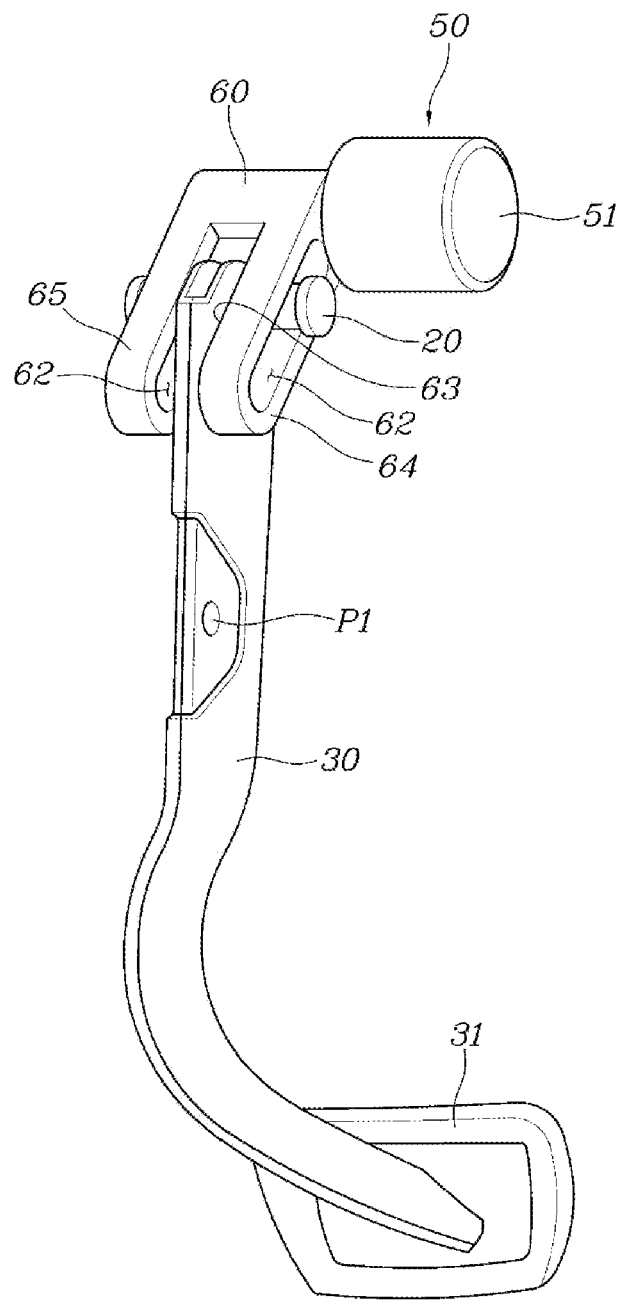
FIG. 10 is a perspective view for describing the connecting bracket of which lower side is formed in a closed structure according to an exemplar)/embodiment of the present disclosure.

In particular, the pedal shaft coupling aperture 62 formed as the elliptical long aperture may be formed to pass through the left and right side surfaces 11 of the connecting bracket 60 along a length direction of the pedal shaft 20, a first end of the pedal shaft coupling aperture 62 facing the motor shaft coupling aperture 61 may be formed in a closed structure, and a second end thereof in an opposite direction may be formed in either an open structure (see FIGS. 1 to 9) or a closed structure (see FIG. 10). When the second end of the pedal shaft coupling aperture 62 is formed in an open structure (e.g., in a downward direction shown in the drawings), there is an advantage in that the pedal shaft 20 may be assembled more easily in a process of inserting the pedal shaft 20 into the pedal shaft coupling aperture 62. In contrast, when the second end of the pedal shaft coupling aperture 62 is formed in a closed structure, there is a disadvantage in that assembly may be difficult compared to the open structure when the pedal shaft 20 is assembled, but there is an advantage of sufficiently securing strength and rigidity of the connecting bracket 60.

Further, the connecting bracket 60 has a structure in which a pedal insertion aperture 63 formed along a length direction (e.g., a vertical direction) of the pedal shaft coupling aperture 62 may be formed in a portion, in which the pedal shaft coupling aperture 62 is formed, at an intermediate position of the connecting bracket 60 in the left-right direction, the connecting bracket 60 may be divided into a first leg portion 64 and a second leg portion 65, in which the pedal shaft coupling holes 62 are formed, at left and right sides based on the pedal insertion aperture 63, the upper end of the brake pedal 30 coupled to the pedal shaft 20 may be inserted into the pedal insertion aperture 63, and both ends of the pedal shaft 20 protruding to both sides of the brake pedal 30 may be inserted into and coupled to the pedal shaft coupling holes 62 of the first leg portion 64 and the second leg portion 65.

Since the both ends of the pedal shaft 20 may be installed to pass through the pedal shaft coupling apertures 62 of the first leg portion 64 and the second leg portion 65 of the connecting bracket 60 and then pass through the guide slots 12 formed on the side surfaces 11 of the pedal member 10, torsional deformation of the pedal shaft 20 along the length direction of the pedal shaft 20 may be prevented due to supporting forces of the connecting bracket 60 and the pedal member 10, and bending deformation of the pedal shaft 20 toward forward and upward may also be prevented. According to the present disclosure, the motor shaft 52 may be disposed above the pedal shaft 20 inserted into the guide slot 12. Consequently, when the connecting bracket 60 is pivoted together with the motor shaft 52, it may be possible to prevent a release phenomenon of the pedal shaft 20 from the pedal shaft coupling aperture 62.

Further, the exemplary embodiment according to the present disclosure may include a permanent magnet 90 (a magnet) fixedly coupled to one end surface of the pedal shaft 20, and a non-contact pedal sensor 100 fixedly installed on one side surface 11 of the pedal member 10. The non-contact pedal sensor 100 may be fixedly welded on one side surface 11 of the pedal member 10 using a separate bracket.

Only when the pedal shaft 20 is rotated in a state in which the permanent magnet 90 faces the non-contact pedal sensor 100, may the non-contact pedal sensor 100 be configured to detect a rotation angle of the permanent magnet 90 through a variation in strength of a magnetic field due to a variation in pivoting position of the permanent magnet 90, thereby generating a signal related to braking. The non-contact pedal sensor 100 may include a printed circuit board (PCB), and the permanent magnet 90 may be coupled to one end surface of the pedal shaft 20, which provides a pivoting center of the brake pedal 30. Consequently, there is an advantage of further improving accuracy of the output signal of the non-contact pedal sensor 100.

Figure 6:
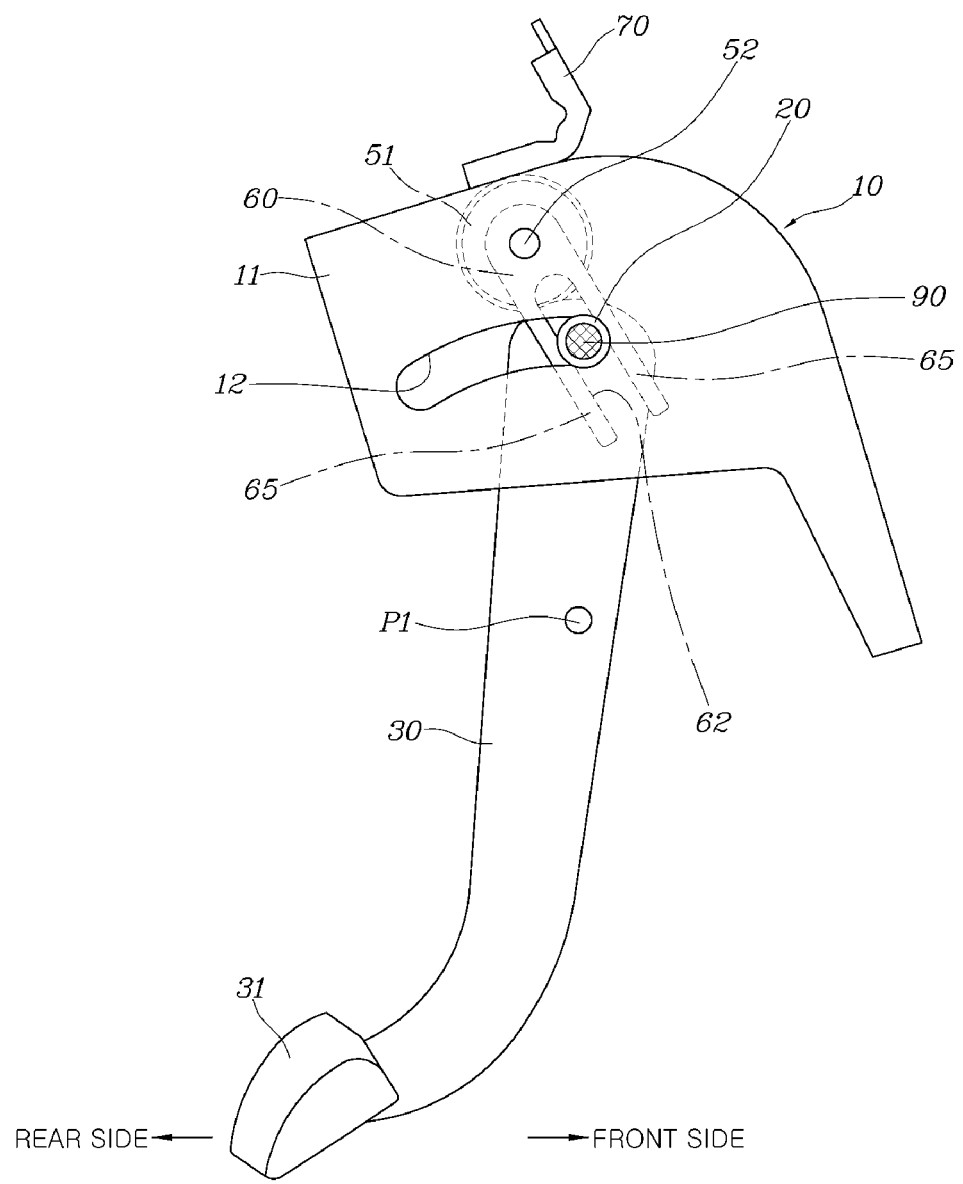
FIG. 6 is a side view illustrating a state in which the non-contact pedal sensor is omitted from FIG. 4 according to an exemplar)/embodiment of the present disclosure.
Figure 7:
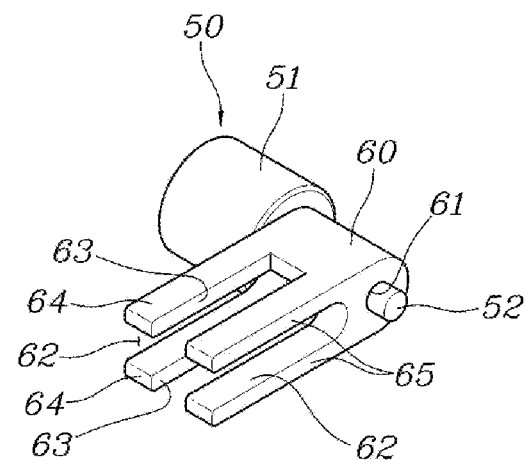
FIG. 7 is a perspective view for describing a connecting bracket of which lower side is open according to an exemplar)/embodiment of the present disclosure.
Figure 7:
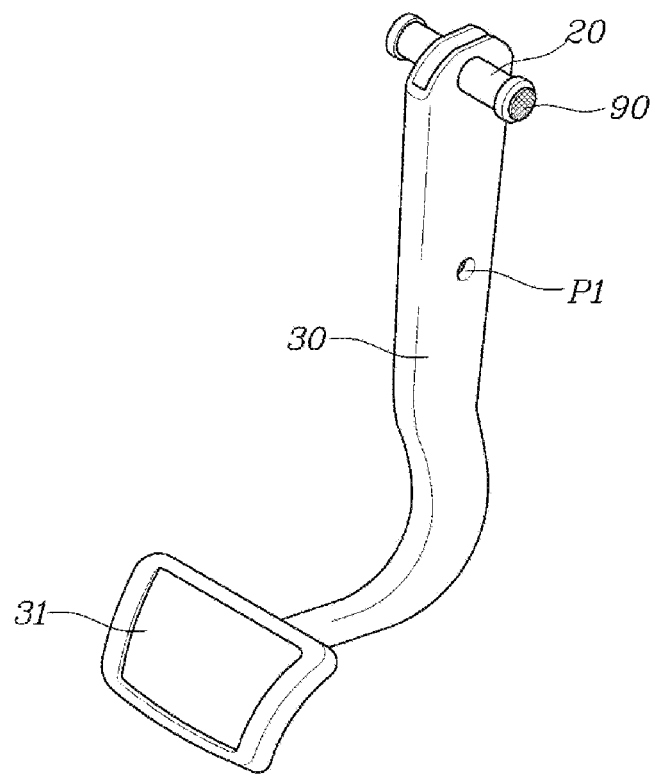
Figure 8:
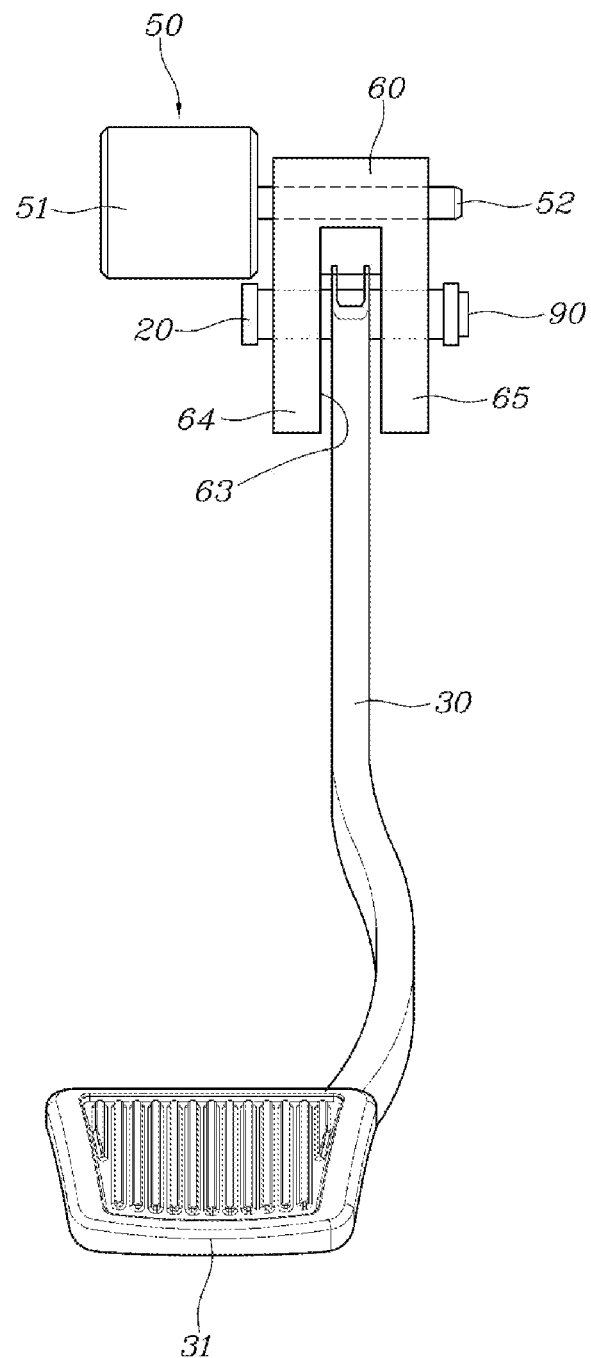
FIGS. 8 and 9 are a front view and a side view illustrating a coupled state of FIG. 7 according to an exemplar)/embodiment of the present disclosure.
Figure 9:
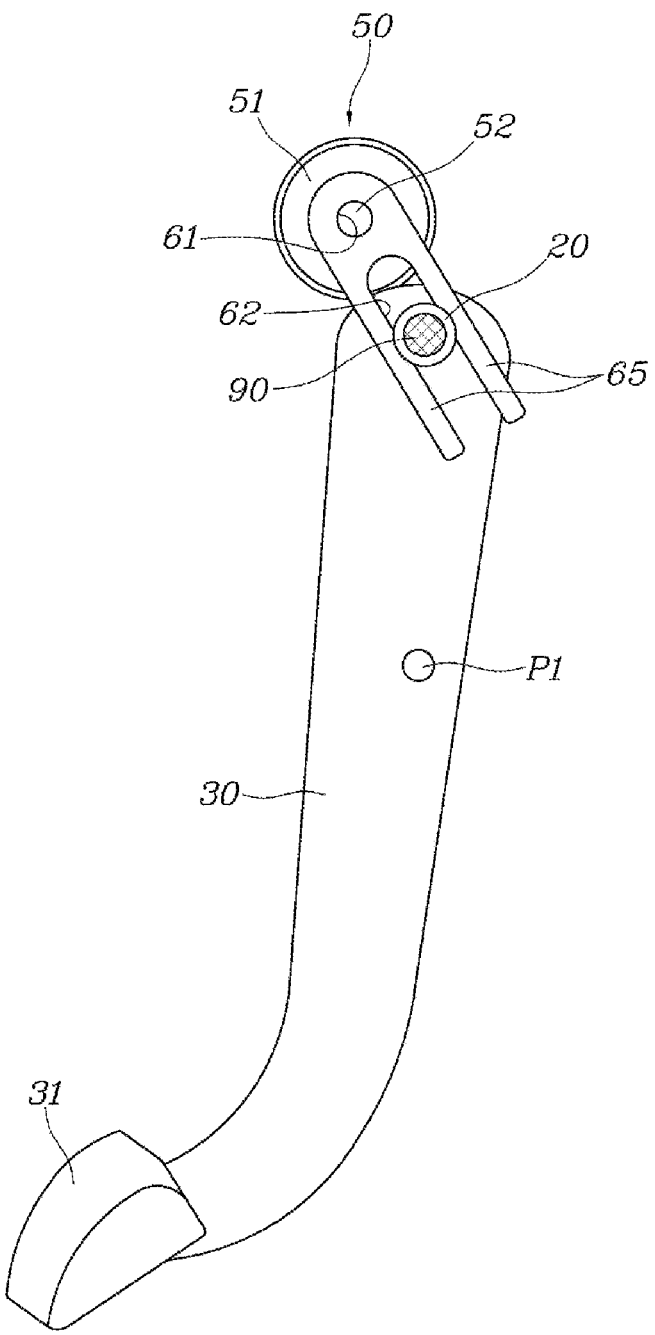
Figure 11:
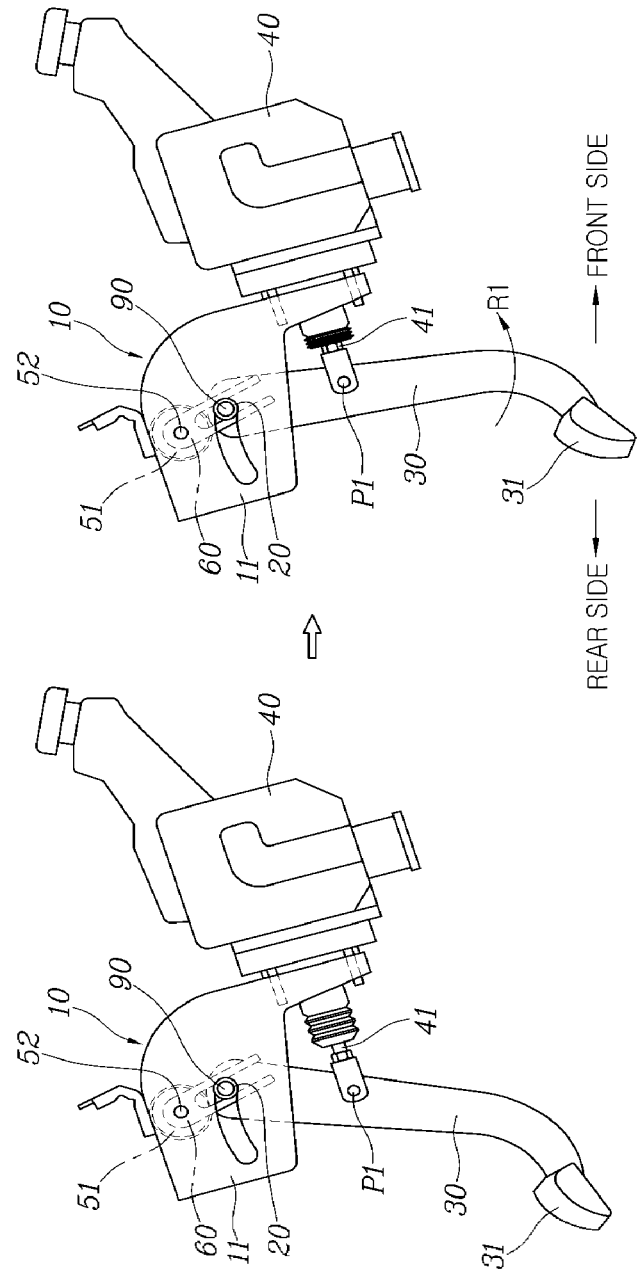
FIG. 11 is a diagram for describing a normal operating state of a brake pedal according to an exemplary embodiment of the present disclosure.

As shown in FIG. 6 and a left diagram of FIG. 11, only when the pedal shaft 20 is disposed at the front end of the guide slot 12, is the permanent magnet 90 coupled to the pedal shaft 20 present in a state of facing the non-contact pedal sensor 100. Thus, when the driver engages the brake pedal 30 in a state in which the permanent magnet 90 and the non-contact pedal sensor 100 face each other, the pedal shaft 20 may be pivoted in a state of being positioned at the front end of the guide slot 12, and, as shown in a right diagram of FIG. 11, the brake pedal 30 may be pivoted forward with respect to the pedal member 10 (in a direction of an arrow R1) due to the pivoting of the pedal shaft 20, and, when the brake pedal 30 is pivoted forward, the brake booster 40 may be operated due to a forward movement of the pedal push rod 41 to generate a hydraulic pressure required for braking.

Additionally, due to the pivoting of the pedal shaft 20, the non-contact pedal sensor 100 may be configured to detect the pivoting angle of the brake pedal 30 through a variation in strength of a magnetic field according to a variation in pivoting position of the permanent magnet 90 and generate a signal related to braking for the vehicle to perform normal braking. Meanwhile, when the pedal shaft 20 is disposed at the front end of the guide slot 12, even when the driver engages the brake pedal 30, since the connecting bracket 60 connected to the step motor 51 supports the pedal shaft 20, the pedal shaft 20 is not moved to the rear end along the guide slot 12. Consequently, the pedal shaft 20 may be pivoted only in a state of being disposed at the front end of the guide slot 12.

Figure 12:
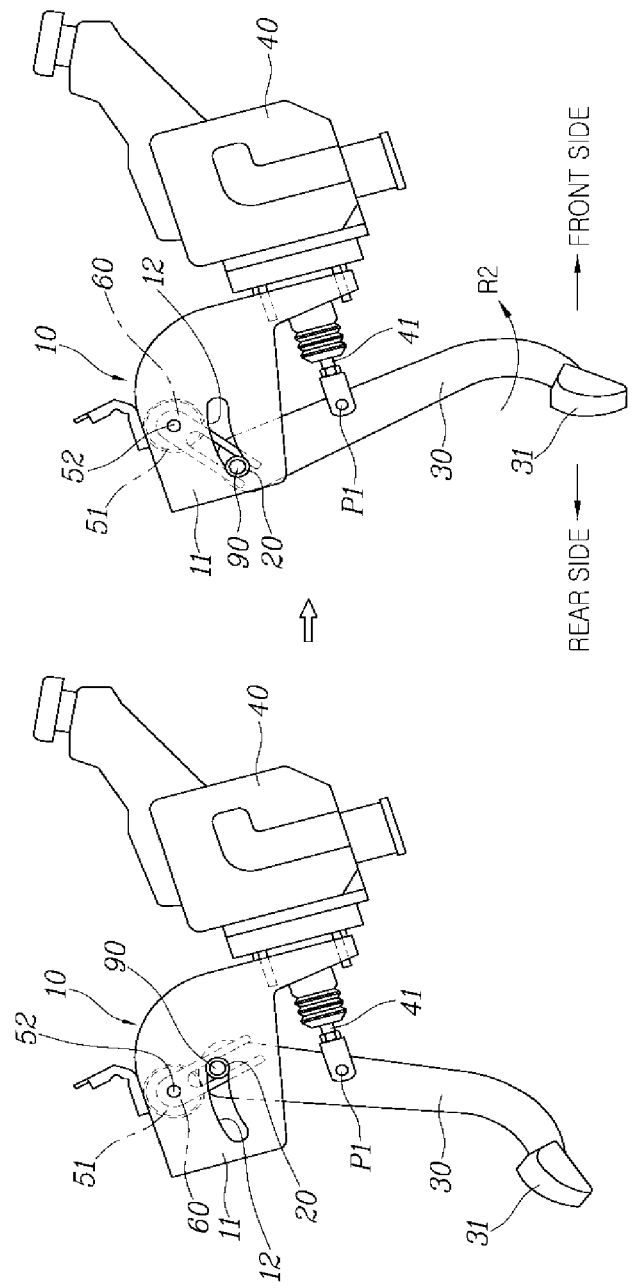
FIG. 12 is a diagram for describing a pop-up state in which a lower end of the brake pedal is exposed to an interior and a concealed state by being pivoted forward according to an exemplar)/embodiment of the present disclosure.

Further, when the pedal shaft 20 is disposed at the front end of the guide slot 12 as shown in FIG. 6 and a left diagram of FIG. 12, when the motor shaft 52 is rotated due to the operation of the step motor 51 and the connecting bracket 60 is pivoted in a clockwise direction together with the motor shaft 52 as shown in a right diagram of FIG. 12, the pedal shaft 20 may be moved to slide along the guide slot 12 from a position of the front end to a position of the rear end, and the brake pedal 30 may be pivoted around the connection point P1 together with the pedal push rod 41 to pivot a lower end of the brake pedal 30 to be moved forward to switch the brake pedal 30 into a concealed (hidden) state in which exposure of the brake pedal 30 to the interior of the vehicle is blocked (an arrow R2).

When the brake pedal 30 switches to the concealed state, the lower space of the driver seat increases without interference of the brake pedal 30 thus allowing the driver to rest comfortably in a relaxation mode. In particular, when the pedal shaft 20 is moved from the position of the front end of the guide slot 12 toward the position of the rear end thereof due to the operation of the actuator 50, the state in which the permanent magnet 90 coupled to the pedal shaft 20 faces the non-contact pedal sensor 100 coupled to the pedal member 10 may be terminated. In the state in which the permanent magnet 90 does not face the non-contact pedal sensor 100, even when the driver steps on to pivot the brake pedal 30, the signal related to braking is not generated through the non-contact pedal sensor 100 and thus, in an autonomous driving mode, it may be possible to prevent in advance a situation in which the driver inadvertently operates the brake pedal 30.

In contrast, when the motor shaft 52 and the connecting bracket 60 are pivoted in a counterclockwise direction due to the operation of the step motor 51 as shown in the left diagram of FIG. 12 in the state in which the pedal shaft 20 is disposed at the rear end of the guide slot 12 as shown in the right diagram of FIG. 12, the pedal shaft 20 may be moved to slide from the rear end of the guide slot 12 toward the front end thereof. Consequently, the brake pedal 30 may be pivoted around the connection point P1, and thus the lower end of the brake pedal 30 may be pivoted and moved to a rear side at which the driver is present and thus, the brake pedal 30 may switch to a pop-up state of protruding to the interior of the vehicle in which the driver is present again.

As described above, the foldable brake pedal apparatus for an autonomous driving vehicle according to the present disclosure is configured such that, in the manual driving mode in which the driver directly operates the vehicle, the lower end of the brake pedal 30 may be popped up to be exposed to the interior of the vehicle to allow the driver to operate and engage the brake pedal 30, and, in the autonomous driving mode in which the driver does not directly drive the vehicle, the lower end of the brake pedal 30 may be pivoted and moved forward due to the operation of the actuator 50 to switch to the concealed state in which an operation due to the driver is impossible. Consequently, there are advantages in that, in the autonomous driving mode, the driver may rest comfortably, and further, it may be possible to achieve safety improvement by blocking the incorrect operation of the brake pedal 30.

Although an exemplary embodiment of the present disclosure has been described for illustrative purposes, those skilled in the art will appreciate that various modifications, additions and substitutions are possible, without departing from the scope and spirit of the present disclosure as disclosed in the accompanying claims.

What is claimed is:

1. A foldable brake pedal apparatus for an autonomous driving vehicle, comprising:
    a pedal member fixedly installed in a lower space of a driver seat and in which guide slots are formed in left and right side surfaces of the pedal member and extend in a front-rear direction;
    a pedal shaft installed to pass through the left and right side surfaces of the pedal member through the guide slots and moved along the guide slots;
    a brake pedal coupled to the pedal shaft and in which a lower part of the pedal shaft is connected to a brake booster through a pedal push rod;
    a permanent magnet fixedly coupled to one end surface of the pedal shaft; and
    a non-contact pedal sensor fixedly installed in the pedal member,
    wherein, when the pedal shaft is disposed at a front end of the guide slot, a lower end of the brake pedal is maintained in a pop-up state of being exposed to an interior of a vehicle in which a driver is present,
    wherein, when the pedal shaft is moved from the front end of the guide slot to a rear end of the guide slot, the brake pedal is pivoted around a connection point together with the pedal push rod to cause the lower end of the brake pedal to pivot forward to switch to a concealed state preventing exposure to the interior of the vehicle, and
    wherein, in a state in which the permanent magnet faces the non-contact pedal sensor and the pedal shaft is pivoted, the non-contact pedal sensor is configured to detect a rotation angle of the brake pedal through a variation in strength of a magnetic field due to a variation in pivoting position of the permanent magnet and to generate a signal related to braking.

2. The foldable brake pedal apparatus of claim 1, further comprising:
    an actuator fixedly installed in the pedal member; and
    a connecting bracket that connects the actuator to the pedal shaft and transmit power of the actuator to the pedal shaft, wherein the pedal shaft is moved along the guide slot when the actuator is operated.

3. The foldable brake pedal apparatus of claim 1, further comprising:
    a return spring installed to connect the pedal member to the brake pedal and configured to accumulate an elastic force as a length of the return spring is stretched when the driver engages the brake pedal and causing the brake pedal to pivot forward and pivot and return the brake pedal rearward with the accumulated elastic force when the brake pedal is released.

4. The foldable brake pedal apparatus of claim 1, wherein:
    the guide slot is formed in an arc shape extending along a pivoting radius based on a connection point of the brake pedal and the pedal push rod in a front-rear direction;
    the permanent magnet, which is coupled to the pedal shaft in a state in which the pedal shaft is disposed at the front end of the guide slot, is maintained in a state of facing the non-contact pedal sensor; and
    when the brake pedal is pivoted in the state in which the permanent magnet faces the non-contact pedal sensor, the non-contact pedal sensor is configured to generate the signal related to braking.

5. The foldable brake pedal apparatus of claim 1, wherein:
    the guide slot is formed in an arc shape extending along a pivoting radius based on a connection point of the brake pedal and the pedal push rod in a front-rear direction;
    when the pedal shaft is moved to slide from a position of the front end of the guide slot toward a position of the rear end thereof, the state in which the permanent magnet coupled to the pedal shaft faces the non-contact pedal sensor is terminated; and
    when the brake pedal is pivoted upon termination of the state in which the permanent magnet faces the non-contact pedal sensor, the non-contact pedal sensor does not generate the signal related to braking to prevent an inadvertent operation of the brake pedal.

6. The foldable brake pedal apparatus of claim 1, wherein:
    the guide slots are formed in the same shape on the left and right side surfaces of the pedal member;
    each of the guide slots is formed in an arc shape extending along a pivoting radius based on a connection point of the brake pedal and the pedal push rod in a front-rear direction; and
    the front end and the rear end of each of the guide slots are formed in a closed structure due to the pedal member.

7. The foldable brake pedal apparatus of claim 2, wherein:
    the actuator includes a step motor and a motor shaft;
    a motor shaft coupling aperture and a pedal shaft coupling aperture are formed at a first side and a second side of the connecting bracket;
    the motor shaft is inserted into the motor shaft coupling aperture, and the connecting bracket is integrally coupled to the motor shaft;
    the pedal shaft is inserted into the pedal shaft coupling aperture; and
    the pedal shaft coupling aperture is formed as an elliptical long aperture to allow movement of the pedal shaft when the connecting bracket is pivoted together with the motor shaft.

8. The foldable brake pedal apparatus of claim 7, wherein the pedal shaft coupling aperture formed in the elliptical long aperture is formed to pass through left and right side surfaces of the connecting bracket along a length direction of the pedal shaft, a first end of the pedal shaft coupling aperture toward the motor shaft coupling aperture is formed in a closed structure, and a second end of the pedal shaft coupling aperture in a direction opposite to the first end is formed in an open structure.

9. The foldable brake pedal apparatus of claim 7, wherein the pedal shaft coupling aperture formed in the elliptical long aperture is formed to pass through left and right side surfaces of the connecting bracket along a length direction of the pedal shaft, and a first end of the pedal shaft coupling aperture toward the motor shaft coupling aperture and a second end of the pedal shaft coupling aperture in a direction opposite to the first end are formed in a closed structure.

10. The foldable brake pedal apparatus of claim 7, wherein:
- a pedal insertion aperture formed in a length direction of the pedal shaft coupling aperture is formed at an intermediate position of the connecting bracket in a left-right direction in a portion in which the pedal shaft coupling aperture is formed in the connecting bracket;
- the pedal insertion aperture is divided into a first leg portion and a second leg portion at which the pedal shaft coupling aperture is formed at each of left and right sides of the pedal insertion aperture based on the pedal insertion aperture;
- an upper end of the brake pedal coupled to the pedal shaft is inserted into the pedal insertion aperture; and
- both ends of the pedal shaft protruding to both sides of the brake pedal are inserted into and coupled the pedal shaft coupling holes of the first leg portion and the second leg portion.

11. The foldable brake pedal apparatus of claim 7, wherein the motor shaft is disposed above the pedal shaft inserted into the guide slot and when the connecting bracket is pivoted together with the motor shaft, the motor shaft prevents a release phenomenon of the pedal shaft from the pedal shaft coupling aperture.

* * * * *